United States Patent
Yang et al.

(10) Patent No.: US 6,696,521 B2
(45) Date of Patent: Feb. 24, 2004

(54) HIGH PERFORMANCE ORTHO UPR

(75) Inventors: Lau S. Yang, Wilmington, DE (US); Paul Malcolm Puckett, Lake Jackson, TX (US)

(73) Assignee: Arco Chemical Technology, LP, Greenville, DE (US)

( * ) Notice: Subject to any disclaimer, the term of this patent is extended or adjusted under 35 U.S.C. 154(b) by 26 days.

(21) Appl. No.: 10/207,256

(22) Filed: Jul. 29, 2002

(65) Prior Publication Data

US 2004/0019158 A1 Jan. 29, 2004

(51) Int. Cl.$^7$ .......................... C08L 67/06; C08G 63/52

(52) U.S. Cl. ................. 525/168; 528/302; 528/306; 528/308; 525/445

(58) Field of Search ............................ 528/302, 306, 528/308; 525/168, 445

(56) References Cited

U.S. PATENT DOCUMENTS

| | | | |
|---|---|---|---|
| 5,677,396 A | 10/1997 | Klang | 525/445 |
| 5,854,359 A | 12/1998 | Yang | 525/444 |
| 5,880,225 A | 3/1999 | Yang et al. | 525/440 |

OTHER PUBLICATIONS

B. C. Trivedi and B. M. Culbertson, "Maleic Anhydride," *Indus. Eng. Chem. Prod. Res.Dev.* 3 (*3*), 218 (1964).

*Primary Examiner*—Samuel A. Acquah
(74) *Attorney, Agent, or Firm*—Shao Guo

(57) ABSTRACT

A high performance UPR (unsaturated polyester resin) is disclosed. The UPR comprises recurring units of phthalic anhydride, 2-methyl-1,3-propanediol, and maleic anhydride. It has a fumarate/maleate ratio 85/15 or greater. It has a bi- or multi-modal molecular weight distribution. A high molecular weight portion of the UPR has a peak molecular weight (Mp) 50,000 or greater. It has a weight average molecular weight (Mw) 15,000 or greater. An ortho UPR of the invention performs as well as or better than traditional iso UPR.

19 Claims, No Drawings

HIGH PERFORMANCE ORTHO UPR

FIELD OF THE INVENTION

The invention relates to a high performance unsaturated polyester resin. In particular, the invention relates to the preparation of a high performance UPR from 2-methyl-1,3-propanediol.

BACKGROUND OF THE INVENTION

Unsaturated polyester resins (UPRs) are condensation polymers with a polyester backbone formed from a glycol and an unsaturated diacid. Commonly used unsaturated diacids are maleic acid, fumaric acid, and maleic anhydride. Even though fumaric acid offers many advantages in the production of UPRs, it is seldom used because it is usually expensive. Saturated diacids are often used with the unsaturated diacid to control the degree of unsaturation and to modify the physical properties of the UPR. There are two major types of UPRs: "ortho" and "iso." Ortho UPR is made from phthalic anhydride and iso UPR from isophthalic acid. Ortho UPR costs less, but iso UPR performs better.

UPRs are crosslinked, through the unsaturation, with ethylenic monomers such as styrene. To cure well with styrene, the UPR needs a high degree of fumarate unsaturation (fumarate/maleate ratio greater than 90/10). Maleate-containing polyesters do not readily cure with styrene. However, most UPRs are commercially made from maleic anhydride. Thus, it is crucial to effectively isomerize maleate to fumarate during the condensation polymerization.

Many glycols are used for making UPRs. Examples are ethylene glycol, diethylene glycol, propylene glycol, dipropylene glycol, and neopentyl glycol. The degree of isomerization of maleate to fumarate largely depends on the glycol used. In general, the use of a primary glycol leads to a low degree of isomerization, while the use of a secondary glycol leads to a high degree of isomerization. For instance, the esterification of maleic anhydride with neopentyl glycol, ethylene glycol, and propylene glycol gives fumarate/maleate ratios of 50/50, 75/25, and 93/7, respectively. See *Ind. Eng. Chem. Prod. Res. Dev.* 3(3), 218 (1964). Although propylene glycol gives a high fumarate content, it has lower reactivity toward condensation and the resultant UPR often has a dark color.

2-Methyl-1,3-propanediol (MPD) is a relatively new glycol sold by Lyondell Chemical Company as MPDiol™ glycol. It is a high boiling liquid, and it has two primary hydroxyl groups for rapid condensation. However, like other primary glycols, MPD disadvantageously gives UPRs with low fumarate/maleate ratios (from 60/40 to 70/30). Many efforts have been made to increase the fumarate content of UPRs made from MPD.

Co-pending Appl. Ser. No. 09/946,326 teaches a process for making unsaturated polyesters from MPD that have fumarate/maleate ratios greater than 85/15. However, the process requires the use of propylene glycol to boost the isomerization of maleate to fumarate in a late stage of the polymerization.

Co-pending Appl. Ser. No. 10/100,152 teaches a two-step process. In the first step, one equivalent of an aromatic diacid reacts with about two equivalents of MPD to produce an ester diol. In the second step, one equivalent of the ester diol reacts with from about 1.1 to about 1.9 equivalents of maleic anhydride to produce the polyester. This unsaturated polymer is then capped with suitable glycols or alcohols to produce low acid UPRs. The UPR has an increased fumarate/maleate ratio and improved performance. However, the process does not produce an ortho UPR that has the high performance of an iso UPR.

In sum, high-performance UPR is needed. Ideally, an ortho UPR would have the high performance of traditional iso UPR and could be made inexpensively.

SUMMARY OF THE INVENTION

The invention is a high performance UPR (unsaturated polyester resin). The UPR comprises recurring units of phthalic anhydride, 2-methyl-1,3-propanediol, and maleic anhydride. It has a fumarate/maleate ratio 85/15 or greater. It has a bi- or multi-modal molecular weight distribution. By "bi- or multi-modal," we mean that the UPR shows at least two peaks in a GPC (gel permeation chromatography) spectrum. A high molecular weight portion of the UPR has a peak molecular weight (Mp) 50,000 or greater. The UPR has a weight average molecular weight 10,000 or greater. Surprisingly, an ortho UPR of the invention performs as well as or better than traditional iso UPR.

The invention includes a process for making a UPR. The process comprises two steps. First, a mixture comprising phthalic anhydride (PA), 2-methyl-1,3-propanediol (MPD), and maleic anhydride (MA) is polymerized by condensation. The mixture has a (PA+MA)/MPD molar ratio greater than 1. Second, more MPD is added to the resin of step 1. The total moles of MPD added in steps 1 and 2 is greater than the combined moles of PA and MA added in step 1. The polymerization continues to form a UPR having a bi- or multi-modal molecular weight distribution.

DETAILED DESCRIPTION OF THE INVENTION

The invention is a UPR (unsaturated polyester resin). The UPR comprises recurring units of phthalic anhydride, 2-methyl-1,3-propanediol, and maleic anhydride.

Optionally, the UPR of the invention comprises other recurring units. It may comprise recurring units of other glycols. Suitable glycols include ethylene glycol, propylene glycol, diethylene glycol, dipropylene glycol, 1,2-butanediol, 1,3-butanediol, 1,5-pentanediol, 1,6-hexanediol, 2,2-dimethyl-1,3-propanediol, cyclohexane-1,4-dimethanol, and neopentyl glycol, the like, and mixtures thereof. Using other glycols can lower the cost or modify the properties of the UPR. For instance, ethylene glycol is relatively inexpensive. Using diethylene glycol can improve the flexibility of the UPR.

The UPR may comprise recurring units of alcohols. Suitable alcohols include $C_3$ to $C_{10}$ alcohols. Alcohols are used to control molecular weight or modify the properties of the UPR. Sterically bulky alcohols, such as 2-ethylhexan-1-ol, 2-methylhexan-2-ol, 3-methylpentan-3-ol, 2-methylpentan-2-ol, 3-methyl-2-butanol, 2-methylbutan-2-ol, and 3-methyl-2-butanol, are preferred. Suitable alcohols can also be ethylenically or acetylenically unsaturated, for example, 2-methyl-3-buten-2-ol and 3-methyl-1-penten-3-ol. Alcohols are preferably used in an amount less than 10% of the glycol(s).

The UPR may comprise recurring units of other acid derivatives. Suitable acid derivatives include $C_3$ to $C_{10}$ aliphatic, $C_3$ to $C_{10}$ cyclic, and $C_8$ to $C_{20}$ aromatic di- or multifunctional acids. Examples of suitable acids include succinic, oxalic, malonic, glutaric, adipic, pimelic, suberic, azelaic, and sebacic acids, cyclohexanedicarboxylic acid, isophthalic acid, terephthalic acid, and the like.

The recurring units of unsaturated (fumaric and maleic) acids are preferably greater than 35% of the total acids. More preferably, the recurring units of unsaturated acids are greater than 45% of the total acids. Most preferably, the recurring units of the unsaturated acids are greater than 50% of the total acids.

The UPR of the invention has a fumarate/maleate ratio at least 85/15. Preferably, the fumarate/maleate ratio is at least 90/10. More preferably, the fumarate/maleate ratio is at least 95/5. The higher the fumarate/maleate ratio, the more reactive the UPR. Conventional UPR made from 2-methyl-1,3-propanediol has low fumarate content and thus low performance. See Comparative Example 2.

The UPR has a bi- or multi-modal molecular weight distribution. A high molecular weight portion of the distribution has a peak molecular weight (Mp) 50,000 or greater. Preferably, the Mp is 75,000 or greater. More preferably, the Mp is 100,000 or greater. Preferably, the high molecular weight portion is from 2% to about 50% by weight of the total resin composition. More preferably, the high molecular weight portion is from 5% to about 25% of the total resin composition.

The UPR has a weight average molecular weight (Mw) 10,000 or greater. Preferably, Mw is 20,000 or greater. More preferably, Mw is 30,000 or greater. Most preferably, Mw is 35,000 or greater. The Mw of the UPR is significantly greater than the conventional UPR. Usually, a conventional UPR has Mw less than 10,000. Usually, the higher the Mw, the higher the solution viscosity of the UPR. We surprisingly found that the UPR of the invention has a relatively low viscosity in styrene despite its high Mw. This may be due to its bi- or multi-modal molecular weight distribution.

Preferably, the UPR has a molecular weight distribution greater than about 5 and more preferably greater than about 10. Molecular weight distribution is the ratio of weight average molecular weight (Mw) to number average molecular weight (Mn). Conventional UPR usually has Mw/Mn less than 5. This is because condensation polymerization usually produces polymers having relatively narrow molecular weight distributions.

The UPR of the invention can be free-radically cured with vinyl monomers. Suitable vinyl monomers and free-radical initiators are described in U.S. Pat. No. 5,677,396. Examples of vinyl monomers include unsubstituted and substituted vinyl aromatics, vinyl esters of carboxylic acids, acrylates, methacrylates, hydroxyalkyl acrylates, hydroxyalkyl methacrylates, acrylamides, methacrylamides, acrylonitrile, methacrylonitrile, alkyl vinyl ethers, allyl esters of aromatic di- and polyacids, and the like, and mixtures thereof. Preferred vinyl monomers are vinyl aromatics, halogenated vinyl aromatics, methacrylic acid esters, and diallyl esters of aromatic di- and polyacids. Particularly preferred vinyl monomers are styrene, vinyl toluene, methyl methacrylate, and diallyl phthalate.

Generally, the amount of vinyl monomer used will be within the range of about 10 to about 70 wt % based on the amount of cured thermoset. A more preferred range is from about 20 to about 65 wt %. Most preferred range is from 25 wt % to 50 wt %. The amount of vinyl monomer is altered to adjust the viscosity of the solution. A workable viscosity depends on the fabrication process. In general, the viscosity is preferably from about 100 to 2000 cps and more preferably from about 200 to about 600 cps.

Typically, a mixture of UPR and vinyl monomer is combined with a free-radical initiator at room or elevated temperatures and is cured to give a thermoset polymer. The thermosets are often used to form composite materials. A composite usually comprises a thermoset polymer and organic or inorganic fillers including particles, pigments, and fibers (e.g., glass, carbon, nylon, and cotton).

Surprisingly, the UPR of the invention provides its thermoset polymers with high performance. For example, we have made a thermoset polymer made from an ortho UPR of the invention with a DTUL (distortion temperature under load) 101° C. (see Example 1), which is significantly higher than that of a conventional ortho UPR (see (Comparative Examples 2 and 3). Moreover, the thermoset polymer has much greater water resistance than a conventional iso UPR (compare Example 1 with Comparative Example 4).

The invention includes a process for making UPRs. The process comprises two steps. In step 1, a mixture comprising phthalic anhydride (PA), 2-methyl-1,3-propanediol (MPD), and maleic anhydride (MA) is polymerized by condensation. The mixture has a (PA+MA)/MPD molar ratio greater than 1. Preferably, the (PA+MA)/MPD ratio is greater than 1.05. We surprisingly found that using an acid/glycol ratio greater than 1 leads to a product having a high fumarate content (fumarate/maleate ratio of 85/15 or greater). The product of step 1 is an acid-rich resin. By "acid-rich," we mean that the acid number of the resin is preferably greater than 50 mg KOH/g. More preferably, the acid number is greater than 75 mg KOH/g.

Other acids and glycols can be used in step 1. Suitable acids and glycols are discussed above. A key advantage of the invention is that no other acids or glycols are needed to produce a high performance UPR. An ortho UPR made from MA, PA and MPD performs as well as or better than conventional iso UPR.

Step 1 is preferably performed at a temperature within the range of about 150° C. to about 250° C., more preferably from about 185° C. to about 250° C., and most preferably from about 195° C. to about 225° C. One advantage of the invention is that a high reaction temperature is not needed because MPD has two primary hydroxyl groups that react rapidly. Lower reaction temperatures give a lighter color product.

Preferably, the reaction is performed under an inert atmosphere to minimize oxidative side-reactions. This is particularly important when the reaction temperature is relatively high. Preferably, a steam-jacketed reflux condenser is used. Such a condenser allows an efficient removal of water or other volatile products from the reaction mixture but keeps MPD and other reactants in the reactor. The use of a steam-jacketed reflux condenser also helps to avoid a high temperature, which otherwise is often needed to drive water out of the reaction mixture.

Optionally, an esterification catalyst is used in step 1 to accelerate the polymerization. Suitable catalysts include organotin compounds and zinc salts such as zinc acetate, zinc propionate, butyltin oxide hydroxide, dibutyltin oxide, and phenyltin oxide hydroxide. The catalyst can be used in an amount up to about 5,000 ppm based on the amount of the monomers. Preferably, the catalyst is used in an amount from about 1 to about 500 ppm.

In step 2, more MPD is added to the resin of step 1 to continue the polymerization. MPD is added in such an amount that the total moles of MPD added in steps 1 and 2 are greater than the total moles of PA and MA added in step 1, i.e., the combined (PA+MA)/MPD molar ratio is less than 1. Preferably, the molar ratio is within the range of 0.9 to 0.99.

The catalyst from step 1 may also catalyze the reaction of step 2. Alternatively, a different type or an additional amount of catalyst may be added. Suitable catalysts are discussed above. The reaction is preferably performed under an inert atmosphere to minimize oxidative side-reactions.

Step 2 is performed sufficiently long so that a bi- or multi-modal UPR is formed. We surprisingly found that allowing the polymerization to continue long enough not only increases the overall molecular weight of the UPR, but also generates a new, high molecular weight peak. The high molecular weight peak is significantly higher in molecular weight than the overall resin. For instance, in Example 1, the peak molecular weight (Mp) of the high molecular weight peak is about 100,000, which is about three times as high as the weight average molecular weight (Mw) of the overall UPR. As discussed above, this high molecular weight portion may greatly improve the performance of the UPR.

Step 2 may take significantly longer time than a conventional UPR process. While a conventional UPR process usually takes about 8–12 hours, a high molecular weight peak may form after 12 hours in step 2 (see Table 2).

The following examples merely illustrate the invention. Those skilled in the art will recognize many variations that are within the spirit of the invention and scope of the claims.

EXAMPLE 1

Preparation of High Performance Ortho UPR

Step 1: A 2L reactor equipped with a mechanical stirrer, nitrogen inlet, and steam-jacketed condenser is charged with phthalic anhydride (PA, 592 grams, 4 moles), 2-methyl-1,3-propanediol (MPD, 620 grams, 6.89 moles), and maleic anhydride (MA, 470 grams, 4.8 moles). The mixture is heated to 210° C. for about 7 hours, producing an acid-rich resin that has an acid number 105 mg KOH/g and fumarate/maleate ratio 97/3.

Step 2: MPD (180 grams, 2.02 moles) is added to the reaction mixture of step 1. The polymerization continues for 26 hours and the GPC spectrum of the resulting UPR shows two major peaks, one at a peak molecular weight (Mp) about 100,000 and another about 9,500. The high molecular weight portion is 19.2% of the UPR.

Thermoset polymers are prepared from the UPR according to the methods disclosed in U.S. Pat. Nos. 5,854,359 (Examples 1–5) and 5,880,225 (Example 26). The physical properties of the thermoset polymers are determined using ASTM test methods. Tensile properties are determined according to ASTM D-638, Type 1. Flexural properties are determined according to ASTM D-790. DTUL is determined according to ASTM D-648. Water resistance is tested by immersing the thermoset polymer specimens in boiling water for 7 days. The specimens before and after immersion are tested. The ratio of the flexural strength after and before immersion is reported as % retention. The test results appear in Table 1.

COMPARATIVE EXAMPLE 2

Preparation of Conventional Ortho UPR From MPD

A three-liter reactor equipped with a mechanical stirrer, nitrogen inlet, and steam-jacketed condenser is charged with MPD (980 grams), PA (711 grams), and MA (560 grams). The mixture is heated at 210° C. for 10 hours. The UPR has a mono-modal molecular weight distribution and fumarate/maleate ratio only 73/27.

Thermoset polymers are prepared. The test results also appear in Table 1. Results in Table 1 show that the UPR of the invention has significantly higher heat resistance (DTUL) and water resistance than the conventional UPR made from MPD.

COMPARATIVE EXAMPLE 3

Preparation of Conventional Ortho UPR From PG

Example 2 is repeated, but propylene glycol (PG) instead of MPD is used. The test results appear in Table 1. Results in Table 1 show that the UPR of the invention has significantly better heat and water resistance than the conventional ortho UPR made from PG.

COMPARATIVE EXAMPLE 4

Preparation of Conventional Iso UPR From PG

Comparative Example 3 is repeated, but isophthalic acid (IPA), instead of phthalic anhydride, is used. The conventional iso UPR is tested for comparison. The results are listed in Table 1, which shows that the UPR of the invention has better water resistance than the conventional iso UPR.

EXAMPLES 5–8

The procedure of Example 1 is repeated in Examples 5–8, but the reaction time of step 2 varies to monitor the formation and growth of the high molecular weight peak.

The results of Table 2 show that a high molecular weight peak forms after about 14 hours of reaction in step 2 and its growth accelerates after about 21 hours. Water resistance of the thermoset polymers made from the UPRs increases with an increase in the % of the high molecular weight peak.

TABLE 1

Comparison of Ortho UPR of the Invention With Conventional Ortho and Iso UPRs

| EXAMPLE # | 1 | C2 | C3 | C4 |
|---|---|---|---|---|
| FORMULATION | | | | |
| MA/PA molar ratio | 1.2 | 1.2 | 1.0 | — |
| MA/IPA molar ratio | — | — | — | 1.0 |
| MPD/(MA + PA) molar ratio | 1.03 | 1.03 | — | — |
| PG/(MA + PA) molar ratio | — | — | 1.05 | — |
| PG/(MA + IPA) molar ratio | — | — | — | 1.05 |
| PHYSICAL PROPERTIES OF UPR | | | | |
| Mw | 38,800 | 5,500 | 5,170 | 10,248 |
| Mn | 3,000 | 1,700 | 1,600 | 2,300 |
| Mw/Mn | 12.7 | 3.2 | 3.2 | 4.5 |
| Fumarate/Maleate ratio | 97/3 | 70/30 | 98/2 | 96/4 |
| Bi-modal or mono-modal | Bi-modal | Mono-modal | Mono-modal | Mona-modal |
| Mp of the high molecular weight peak | 100,000 | — | — | — |
| % of the high molecular weight peak over the total resin | 19.2 | — | — | — |
| Solution viscosity, 55% in styrene, 25° C., cps | 640 | 200 | 250 | 400 |
| PHYSICAL PROPERTIES OF THERMOSET POLYMER | | | | |
| Tensile strength, psi | 11,425 | 8,000 | 7,800 | 12,050 |
| Tensile modulus, ksi | 513 | 540 | 623 | 547 |
| Elongation, % | 3.4 | 2.9 | 1.4 | 2.9 |
| Flexural strength, psi | 21,810 | 19,500 | 17,740 | 24,660 |
| Flexural modulus, ksi | 555 | 530 | 628 | 583 |

TABLE 1-continued

Comparison of Ortho UPR of the Invention With Conventional Ortho and Iso UPRs

| EXAMPLE # | 1 | C2 | C3 | C4 |
|---|---|---|---|---|
| DTUL, ° C. | 101 | 70 | 94.5 | 110 |
| Water resistance, % retention of flexural strength after 7 days immersed in boiling water | 90 | 6 | 6 | 75 |

TABLE 2

High Molecular Weight Peak Growth

| Example # | 5 | 6 | 7 | 8 | 1 |
|---|---|---|---|---|---|
| Reaction time of step 2, hrs | 14 | 16 | 18 | 21 | 26 |
| % of high molecular weight peak | 0.5 | 1.3 | 2.2 | 5.7 | 19.2 |
| Flexural strength retention of ortho resins after 7 days immersed in boiling water, % | 15 | 20 | 25 | 60 | 90 |

We claim:

1. An unsaturated polyester resin (UPR) comprising recurring units of phthalic anhydride, 2-methyl-1,3-propanediol, and maleic anhydride; said UPR having
   (a) a fumarate/maleate ratio 85/15 or greater;
   (b) a weight average molecular weight (Mw) 10,000 or greater; and
   (c) a bi- or multi-modal molecular weight distribution that comprises a high molecular weight portion having a peak molecular weight (Mp) 50,000 or greater.

2. The UPR of claim 1, wherein the Mp is 75,000 or greater.

3. The UPR of claim 1, wherein the Mp is 100,000 or greater.

4. The UPR of claim 1, wherein the Mw is 20,000 or greater.

5. The UPR of claim 1, wherein the Mw is 30,000 or greater.

6. The UPR of claim 1, wherein the Mw is 35,000 or greater.

7. The UPR of claim 1, wherein the fumarate/maleate ratio is 90/10 or greater.

8. The UPR of claim 1, wherein the fumarate/maleate ratio is 95/5 or greater.

9. The UPR of claim 1, wherein the fumarate/maleate ratio is 97/3 or greater.

10. A thermosetting composition comprising the UPR of claim 1 and a monomer selected from the group consisting of vinyl aromatics, acrylates, methacrylates, vinyl ethers, vinyl esters, and mixtures thereof.

11. A thermoset polymer made from the thermosetting composition of claim 10.

12. A thermosetting composition of claim 10, wherein the monomer is styrene.

13. A thermoset polymer made from the thermosetting composition of claim 12.

14. The thermoset polymer of claim 13, which has a distortion temperature under load (DTUL) 90° C. or greater.

15. The thermoset polymer of claim 13, which has a DTUL 100° C. or greater.

16. A process comprising:
   (1) polymerizing by condensation a mixture comprising phthalic anhydride (PA), 2-methyl-1,3-propanediol (MPD), and maleic anhydride (MA) in a (PA+MA)/MPD molar ratio greater than 1 to produce a resin having a fumarate/maleate ratio of 85/15 or greater; and
   (2) adding more MPD to the resin in such an amount that the total moles of MPD added in steps (1) and (2) is greater than the combined moles of PA and MA added in step (1) to continue the polymerization to form a UPR having a bi- or multi-modal molecular weight distribution that comprises a high molecular weight portion having a peak molecular weight (Mp) 50,000 or greater.

17. The process of claim 16, wherein the Mp is 75,000 or greater.

18. The process of claim 16, wherein the Mp is 100,000 or greater.

19. The process of claim 16, wherein the fumarate/maleate ratio is 90/10 or greater.

* * * * *